United States Patent [19]

Kiguchi

[11] Patent Number: 4,489,407
[45] Date of Patent: Dec. 18, 1984

[54] DISK REPRODUCING APPARATUS

[75] Inventor: Majime Kiguchi, Fukaya, Japan

[73] Assignee: Tokyo Shibaura Denki Kabushiki Kaisha, Japan

[21] Appl. No.: 394,724

[22] Filed: Jul. 2, 1982

[30] Foreign Application Priority Data

Jul. 7, 1981 [JP] Japan .................. 56-104973

[51] Int. Cl.³ .............................................. G11B 3/00
[52] U.S. Cl. ................................................. 369/77.2
[58] Field of Search ...................................... 369/77.2

[56] References Cited

U.S. PATENT DOCUMENTS 4,352,174 9/1982 Tajima et al. ............... 369/77.2

*Primary Examiner*—Steven L. Stephan
*Attorney, Agent, or Firm*—Cushman, Darby & Cushman

[57] ABSTRACT

A disk reproducing apparatus comprises a clutch mechanism disposed between a cam gear and a driving motor. The clutch mechanism connects the cam gear with the motor to be capable of transmitting the driving force when the power is turned on and disconnects the motor with the cam gear to cause the cam gear to shift the holding device in a position where the holding device holds of a disk to a position where the disk is released from the hod and then to lower a disk cradle which is connected with the cam gear in a position where the disk cradle is located above a turntable, to a position where the disk cradle is located below the turntable so that the disk supported on the disk cradle is laid on the turntable when the power is turned off.

10 Claims, 26 Drawing Figures

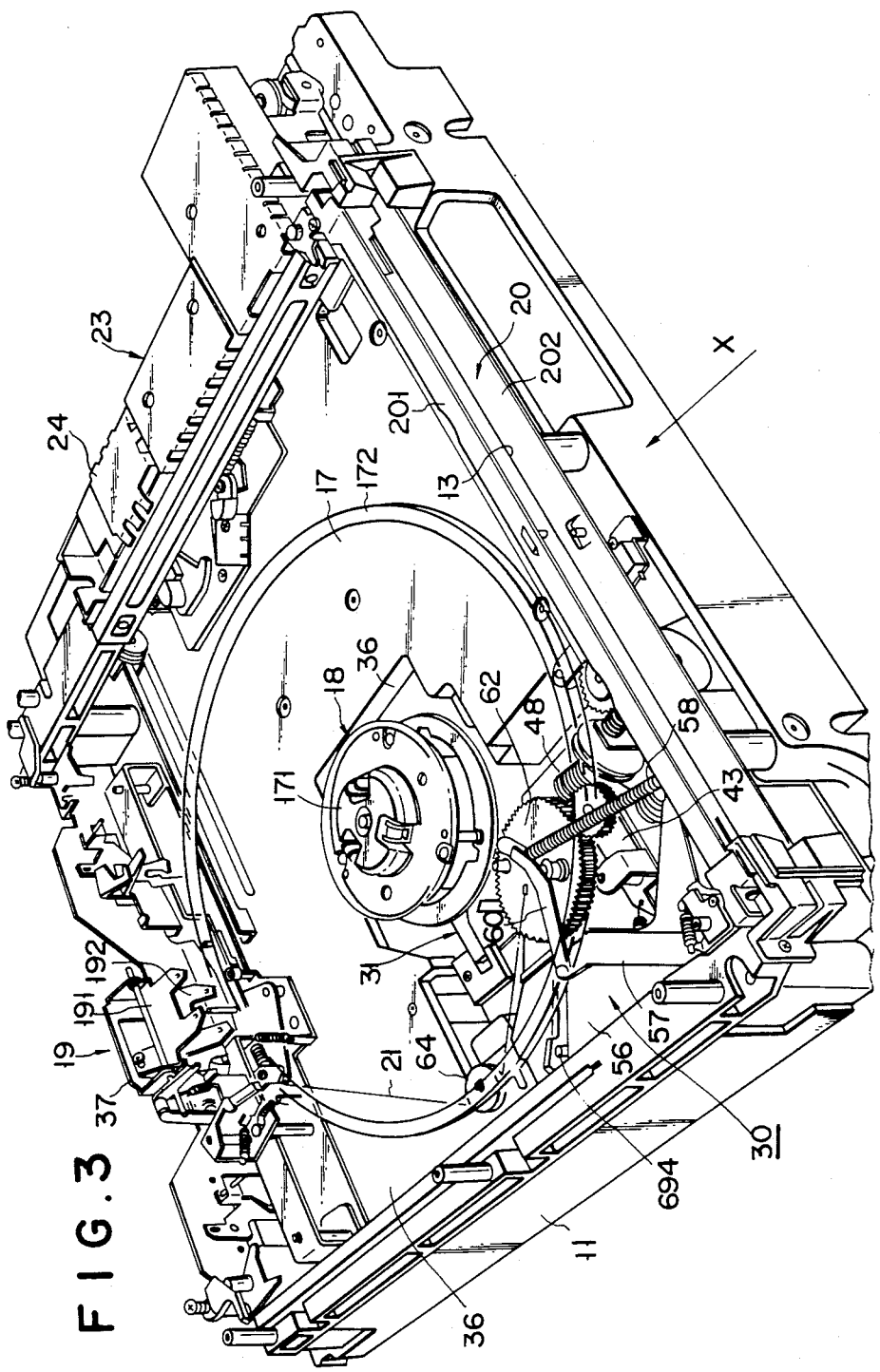

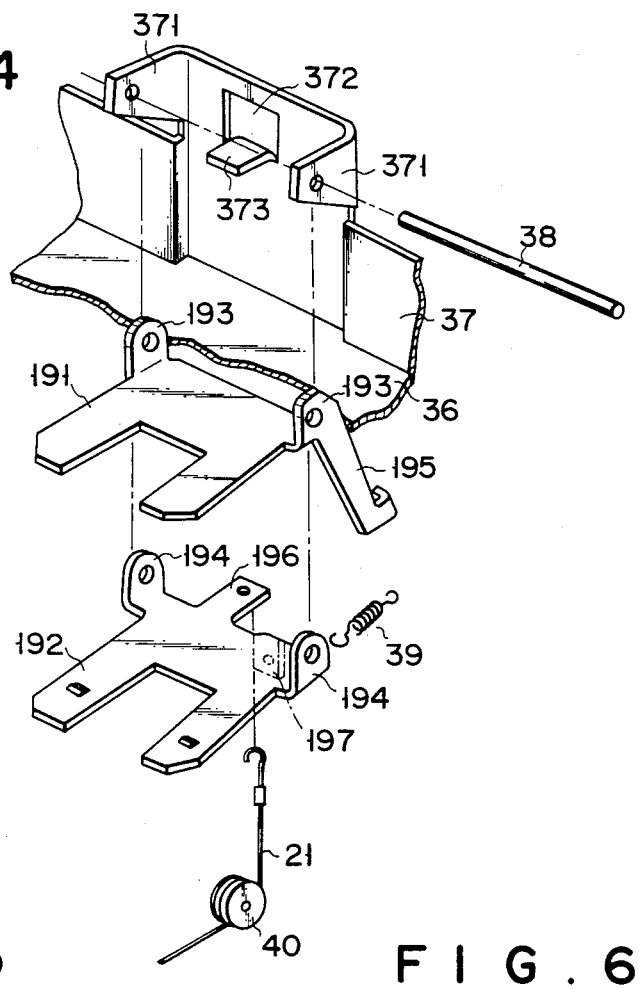
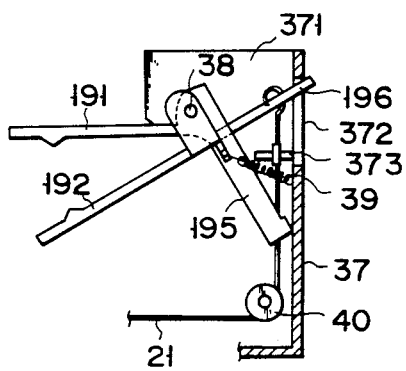
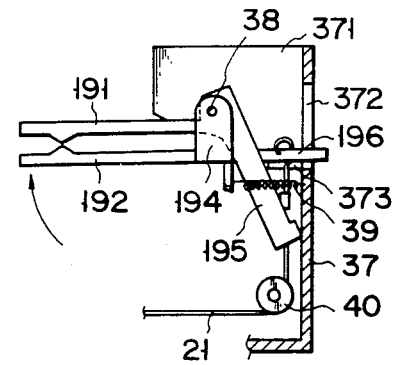

DISK REPRODUCING APPARATUS

BACKGROUND OF THE INVENTION

This invention relates to a disk reproducing apparatus in which a disk is laid on a turntable to be rotated thereon, more specifically to a disk reproducing apparatus with an up-and-down mechanism for setting the disk on the turntable.

Conventionally, in a disk reproducing apparatus (hereinafter referred to simply as a player), a reproducing stylus is put on a recorded disk laid on a turntable so that information recorded on the disk is read out through the reproducing stylus. The information is composed of video and audio signals, and is recorded on the disk at high density on the basis of, for example, the PCM (pulse code modulation) system. If the surface of the disk is soiled by dust or fingerprints, the reproduced information may involve noise; reproduced pictures may sometimes be blurred by noise. It is therefore necessary to insert the disk into the player to put it on the turntable and to take out the disk from the player without directly touching the disk.

To attain this, the disk is housed in a casing with an opening which is openably closed by means of a lid plate, and is inserted into the player while it is kept in the casing. Inside the player, the lid plate is unlocked from the casing by a holding device, and at the same time the disk and the lid plate are held by the holding device. Thus, if the casing is drawn out from the player in this state, the disk and the lid plate will be left in the player. Then, if the empty casing is inserted into the player after reproducing operation is finished, the disk and the lid plate are released from the holding device, and the lid plate is locked to the casing. By drawing out the casing from the player, therefore, the disk may be removed from the player while it is housed together with the lid plate in the casing.

The player is provided with an up-and-down mechanism for setting on the turntable the disk housed in the player. The up-and-down mechanism includes a disk cradle which can move up and down at the rotation center portion of the turntable to support once the unrecorded central portion of the disk. The disk cradle is driven to descend once below a casing insertion plane so as not to interfere with the casing when the casing with the disk therein is inserted into the player; to ascend to receive the disk when the casing is drawn out after the disk and the lid plate are held by the holding device; to descend to set the disk on the turntable for the reproducing operation; and to ascend to raise the disk up to the casing insertion plane after the reproducing operation is completed.

With the prior art player, however, if an operator cuts by mistake the power supply to the player while keeping the disk on the disk cradle on the casing insertion plane, for example, and leaves the player in this state for a long time, then the disk will be warped with its peripheral portion bent by its own weight because only the central portion of the disk is supported on the disk cradle. Having a bad influence on reproducing accuracy, the warp of the disk would have to be prevented.

SUMMARY OF THE INVENTION

The present invention is contrived in consideration of these circumstances, and is intended to provide an apparatus for reproducing signals recorded on a disk, including an up-and-down mechanism capable of preventing the disk from warping.

According to an aspect of the present invention, there is provided an apparatus for reproducing signals recorded on a disk, which comprises a housing having a port through which a casing with the disk therein is inserted into the housing; a turntable rotatably disposed in the housing and having a disk loading surface supporting the outer peripheral edge of the disk to carry the disk thereon; a disk cradle disposed at the central portion of the turntable so as to be able to move up and down and having a disk bearing surface supporting the central portion of the disk to carry the disk thereon, the disk cradle being able to move between a first position where the disk bearing surface is located above the disk loading surface and substantially flush with the port, and a second position where the disk bearing surface is located below the disk loading surface so that the disk supported on the disk bearing surface is laid on the turntable; holding means located substantially flush with the port and capable of moving between a third position where the holding means holds the outer peripheral portion of the disk and a fourth position where the disk is released from the hold; a drive source for supplying a driving force; drive means connected with the holding means and the disk cradle to drive them both by means of the driving force from the drive source, the drive means raising the disk cradle to the first position and then shifting the holding means to the third position when the power is turned on, lowering the disk cradle to the second position while keeping the holding means in the third position as the casing is inserted, raising the disk cradle to the first position as the casing is drawn out, shifting the holding means to the fourth position and then lowering the disk cradle to the second position in response to an instruction for the start of reproducing operation, and raising the disk cradle to the first position and then shifting the holding means to the third position in response to an instruction for the end of the reproducing operation; and a clutch mechanism disposed between the drive means and the drive source, the clutch mechanism connecting the drive source with the drive means thereby being capable of transmitting the driving force when the power is turned on, and the clutch mechanism disconnecting the drive source with the drive means thereby causing the drive means to shift the holding means in the third position to the fourth position and then to lower the disk cradle in the first position to the second position when the power is turned off.

BRIEF DESCRIPTION OF THE DRAWINGS

FIG. 3 is a perspective view schematically showing mechanisms inside a housing;

FIG. 4 is a disassembled perspective view extractively showing a holding device;

FIG. 5 is a side view of the holding device in the position not to hold a disk;

FIG. 6 is a side view of the holding device in the position to hold the disk;

FIG. 21 is a plan view showing the drive mechanism in the state before the power is turned on;

FIG. 22 is a plan view showing the drive mechanism in the state immediately after the power is turned on;

DETAILED DESCRIPTION OF THE PREFERRED EMBODIMENT

There will now be described in detail one embodiment of a disk reproducing apparatus for reproducing a signal recorded on a disk according to the present invention with reference to the accompanying drawings.

Figure 1:
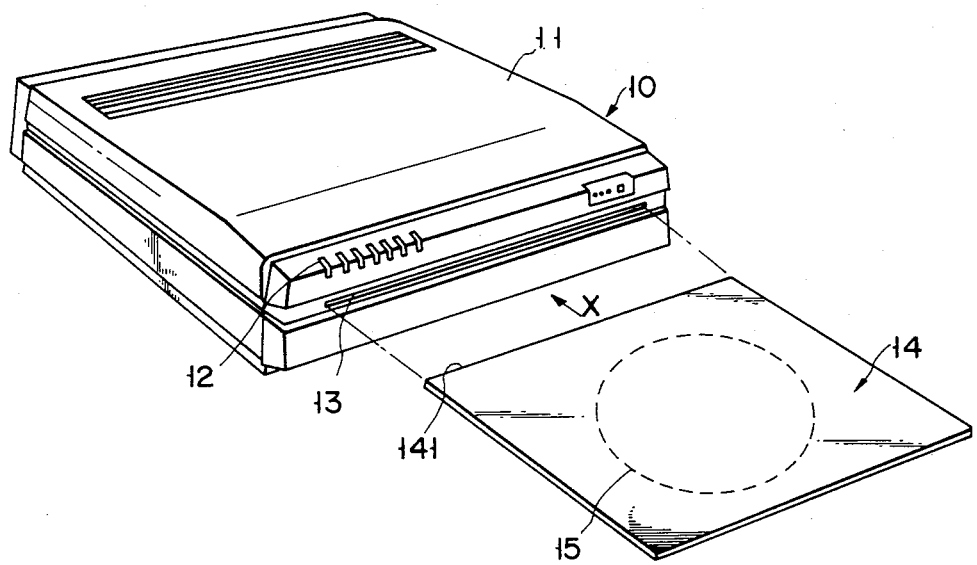
FIG. 1 is a perspective view showing one embodiment of a disk reproducing apparatus according to the present invention along with a casing.
Figure 2:
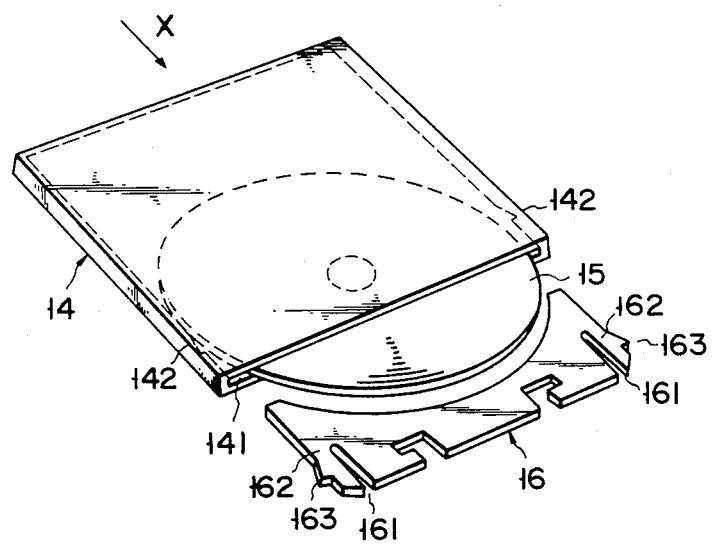
FIG. 2 is a perspective view showing the casing along with a disk and a lid plate.

As shown in FIG. 1, a disk reproducing apparatus (hereinafter referred to as player) 10 is provided with a housing 11. Attached to one side edge of the upper surface of the housing 11 are a plurality of operating buttons 12 for setting various operation modes. Formed in one lateral face of the housing 11 is an inlet slot 13 through which a casing 14 as mentioned later is inserted into the housing 11 along a casing inserting direction X. As shown in FIG. 2, the casing 14 is in the form of a thin, hollow box with an opening 141 in one lateral face thereof. A disk 15 is inserted through the opening 141 into the casing 14 in the opposite direction to the casing inserting direction X to be housed therein. A lid plate 16 is detachably fitted to the opening 141. When the lid plate 16 is fitted in the opening 141, it blocks the opening 141 so that the disk 15 housed in the casing 14 should not slip off through the opening 141.

Formed at both side portions of the lid plate 16 along the inserting direction X are a pair of slits 161 which extend over a predetermined length along the opposite direction to the inserting direction X. Each slit 161 defines an elastic strip 162 on each side of the lid plate 16. An outwardly projected click 163 is formed at the middle portion of each elastic strip 162. A slant face is formed at the tip end of each elastic strip 162. As shown in FIG. 2, the click 163 has an engaging surface to intersect the inserting direction X at right angles and a pressing surface sloping outward along the inserting direction X. An engaging groove 142 capable of receiving each corresponding click 163 of the lid plate 16 is formed in that portion of each inner lateral face of the casing 14 defining the inside space thereof which is to face the click 163 when the lid plate 16 is entirely housed in the casing 14.

Projections (not shown) are formed at the substantially central portions of the upper and lower surfaces of the front end portion of the lid plate 16, severally. A penetrating hole (not shown) capable of receiving each corresponding projection of the lid plate 16 is formed in that portion of each bottom face of the casing 14 defining the inside space thereof which is to face the projection when the lid plate 16 is entirely housed in the casing 14.

The disk 15 is housed in the casing 14 in the following manner so that it cannot be taken out by hand. First, the disk 15 is inserted into the empty casing 14 through the opening 141. Then, the lid plate 16 is inserted into the casing 14 so as to block the opening 141. When the clicks 163 touch both end edge portions of the opening 141, respectively, in the middle of the insertion of the lid plate 16, both elastic strips 162 are pushed inward as the pressing surfaces of their respective clicks 163 engage the edge portions, and the lid plate 16 is further inserted into the casing 14. The moment the lid plate 16 is fully inserted into the casing 14, the clicks 163 of the lid plate 16 are caused to be fitted in their corresponding engaging grooves 142 of the casing 14 by the elasticity of the elastic strips 162, and the projections (not shown) of the lid plate 16 get into their corresponding penetrating holes (not shown) of the casing 14. Thus, the lid plate 16 finishes being locked to the casing 14. In this locked state, the opening 141 of the casing 14 is entirely closed, so that there is no fear of dust entering the casing 14 to soil the disk 15. Since the lid plate 16 is locked to the casing 14, moreover, the disk 15 would never be drawn out of the casing 14 by hand.

As shown in FIG. 3, a turntable 17 which is illustrated as if it were made of transparent material is rotatably set in the housing 11. The turntable 17 is rotated by a drive mechanism (not shown) with the aid of a belt (not shown). The vertical position of the turntable 17 is fixed. A center spindle 171 is formed at the central portion of the turntable 17, and a ridge 172 is formed throughout the outer peripheral portion of the surface of the turntable 17. The ridge 172 corresponds to an annular non-recording portion formed at the outer peripheral portion of the disk 15 laid on the turntable 17. Namely, the upper surface of the ridge 172 is defined as a disk loading surface.

A disk cradle 18 is disposed at the central portion of the turntable 17 so as to be capable of vertical shifting. The disk cradle 18 is driven by an up-and-down mechanism 31, as described in detail later, to move vertically between a position (a first position) to receive the disk 15 held by a holding device 19 (mentioned later) and located above the disk loading surface of the turntable 17 and a position (a second position) below the disk loading surface of the turntable 17 to allow the received disk 15 to be laid on the turntable 17. Inside the housing 11 surrounding the inlet slot 13, as schematically shown in FIG. 3, there is provided an opening mechanism 20 for widening the opening 141 of the casing 14 inserted through the inlet slot 13 to disengage the projections from the penetrating holes. The opening mechanism 20 includes upper and lower lid members 201 and 202 aligned with the casing inlet slot 13. The lid members 201 and 202 are rockably arranged so that they can open the casing inlet slot 13, engaging the upper and lower end edges, respectively, of the casing 14 being inserted. As the casing 14 is inserted deeper, the lid members 201 and 202 rock toward the inside of the housing 11 to widen the opening 141 of the casing 14. The opening mechanism 20 is allowed to move as a whole within the housing 11, namely, the opening mechanism 20 can be moved, with the opening 141 of the casing 14 kept open, between a position (a third position) at the back of the inlet slot 13 and a position (a fourth position) at the innermost part of the housing 11 as viewed along the inserting direction X, as the casing 14 is inserted into or drawn out from the housing 11. The opening mechanism 20 is fitted with a roller 22 moving together therewith and capable of engaging a cam lever 56 of a drive mechanism 30 as mentioned later.

The aforementioned holding device 19 is disposed at the innermost part of the housing 11 and located flush with the inlet slot 13. The holding device 19 unlocks the lid plate 16 from the casing 14 and holds the lid plate 16 and the disk 15 when the casing 14 containing the disk 15 therein and having its opening 141 closed by the lid plate 16 is inserted into the housing 11 through the inlet slot 13 to have its inserted end located at the innermost part of the housing 11; releases only the disk 15 in accordance with an instruction for reproducing operation; holds the disk 15 again on completion of the reproducing operation; and releases the lid plate 16 and the disk 15, and locks the lid plate 16 to the casing 14 when the empty casing 14 is inserted into the housing 11. In holding the disk 15, the holding device 19 grasps the annular non-recording portion at the outer peripheral portion of the disk 15 on both sides.

As shown in FIG. 4, the holding device 19 includes two fingers 191 and 192 arranged vertically. The upper and lower fingers 191 and 192 are each provided with a parallel pair of lugs 193 and 194, respectively. An extended strip 195 integrally extends obliquely downward from one of the lugs 193 of the upper finger 191. The extended strip 195 functions as a stopper. Formed on the rear end edge of the lower finger 192 is a tongue 196 extending backward or in the inserting direction X and a bent strip 197 hanging downward. A penetrating hole is bored through each of the lugs 193 and 194.

To support the upper and lower fingers 191 and 192, an auxiliary chassis 37 rises from the innermost part of a chassis 36 of the housing 11. Formed on the auxiliary chassis 37 are a pair of support strips 371 for supporting the upper and lower fingers 191 and 192 together. The support strips 371 are so located as to face the casing inlet slot 13. An opening 372 is formed in that portion of the auxiliary chassis 37 which lies between the pair of support strips 371, and a receiving portion 373 extends from the lower end edge of the opening 372 toward the interior of the housing 11. A penetrating hole is bored through each support strip 371.

The upper and lower fingers 191 and 192 are pivotally supported on the pair of support strips 371 with a common shaft 38 passed through the holes in the support strips 371. Namely, the lower finger 192 is allowed to rock between a position (a fifth position) where it is held substantially horizontal and a position (a sixth position) which is reached when the lower finger 192 in the fifth position is rocked counterclockwise through a predetermined angle around the shaft 38. The lower finger 192 can support the lower surface of the disk 15 when it is in the fifth position, and does not when in the sixth position. As for the upper finger 191, it is allowed to move between a position (a seventh position) where the disk 15 and the lid plate 16 are allowed to be inserted between the upper and lower fingers 191 and 192 when the lower finger 192 is in the fifth position, and a position (an eighth position) where the disk 15 located between the upper finger 191 and the lower finger 192 in the fifth position is seized tight and held irremovably. A spring 39 is stretched between the bent strip 197 of the lower finger 192 and the auxiliary chassis 37. The spring 39 urges the lower finger 192 to rock counterclockwise or from the fifth position to the sixth. Namely, the spring 39 causes the lower finger 192 to be located in the sixth position where the lower finger 192 is inclined at a predetermined angle to the upper finger 191 in the absence of any external force on the lower finger 192, as shown in FIG. 5. The sixth position of the lower finger 192 is defined as the upper surface of the tongue 196 runs against the upper end edge of the window 372 of the auxiliary chassis 37.

The tongue 196 of the lower finger 192 is connected with one end of a wire 21. The wire 21 is connected to the drive mechanism 30 by way of a pulley 40. The drive mechanism 30, which is to be described in detail later, pulls the wire 21 except when it lowers the disk cradle 18 under the condition that the disk 15 on the disk cradle 18 should be laid on the turntable 17. Thus, only while the disk cradle 18 is descending under such condition, the wire 21 is not pulled, so that the lower finger 192 is rocked downward by the urging force of the spring 39 to be held in the sixth position, as shown in FIG. 5. Except while the disk cradle 18 is descending under the aforesaid condition, on the other hand, the wire 21 is pulled by the drive mechanism 30, so that the lower finger 192 is rocked upward against the urging force of the spring 39 to be held in the fifth position in close vicinity to the upper finger 191, as shown in FIG. 6. The fifth position of the lower finger 192 is defined as the tongue 196 abuts on the receiving portion 373.

The upper finger 191 is connected with a pressing mechanism (not shown in detail) for pressing the upper finger 191 toward the lower finger 192 to shift the upper finger 191 from the seventh position to the eighth position so that the disk 15 may be held between the two fingers 191 and 192 when its peripheral portion is inserted between them.

As shown again in FIG. 3, a pickup arm 23 is disposed above the turntable 17 inside the housing 11 so as to be able to move along the direction to intersect the inserting direction X at right angles. The pickup arm 23 is provided with a cartridge 24, and a reproducing stylus (not shown) is attached to the lower surface of the cartridge 24. When the reproducing stylus is brought into slide contact with the disk 15 laid on the turntable 17, information recorded on the disk 15 is read out through the stylus. The pickup arm 23 is driven by a drive mechanism (not shown).

Referring now to FIGS. 7 to 14, there will be described the way the disk 15 is laid on the turntable 17.

Figure 7:
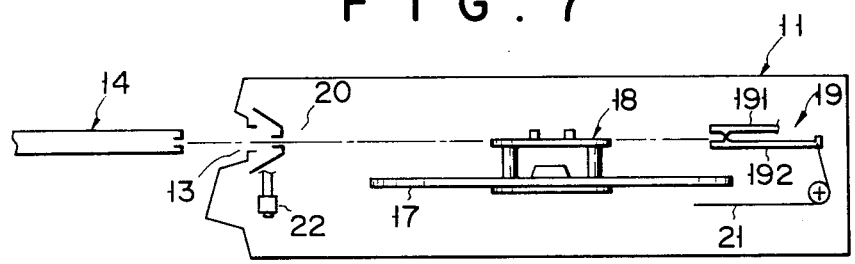
FIGS. 7 to 15 are schematic side views for illustrating the operations of a disk cradle and the holding device in association with several processes of insertion of the casing.

As shown in FIG. 7, the casing 14 containing the disk 15 therein and having its opening 141 closed by the lid plate 16 is inserted into the housing 11 through the inlet slot 13. Hereupon, in the player 10 connected with the power supply, the disk cradle 18 is held in the first position to be ready to receive the inserted disk 15, and the upper and lower fingers 191 and 192 of the holding device 19 are brought close to each other to be ready to receive the disk 15 and the lid plate 16 between them. As for the opening mechanism 20, it is held in the third position just behind the inlet slot 13. The upper and lower fingers 191 and 192 are held in the seventh and fifth positions, respectively.

Figure 8:
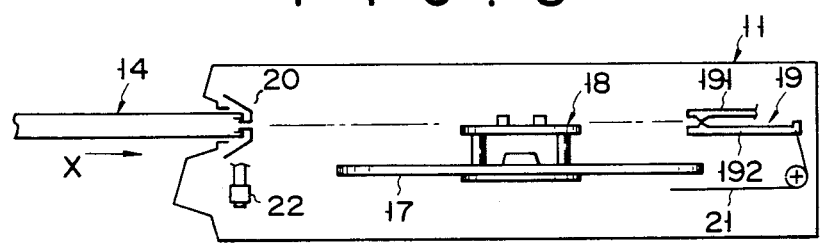
Figure 9:
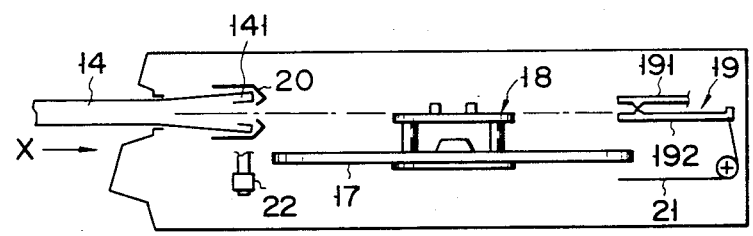
Figure 10:
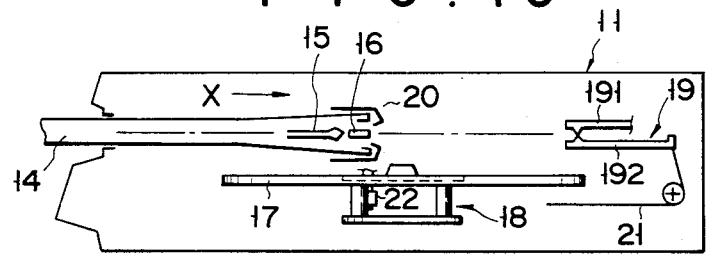

When the casing 14 is inserted through the inlet slot 13, the opening mechanism 20 engages the opening 141 of the casing 14, as shown in FIG. 8. When the casing 14 is inserted deeper, the opening mechanism 20 widens the opening 141 of the casing 14, as shown in FIG. 9, and moves from the third position toward the fourth position as the casing 14 is pushed in. As the inserted end of the casing 14 approaches the disk cradle 18, the disk cradle 18 once goes down to the second position, as shown in FIG. 10, lest it should prevent the insertion of the casing 14.

Figure 11:
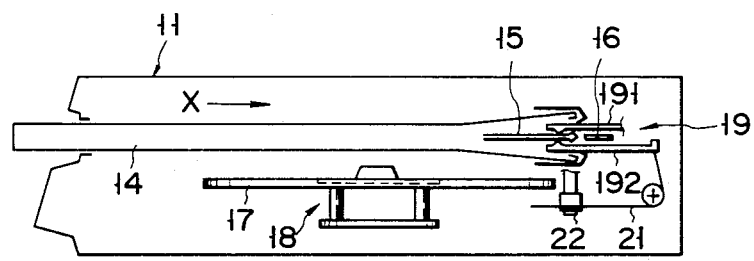

When the casing 14 reaches the innermost part of the housing 11, the lid plate 16 and the disk 15 inserted in the casing 14 squeeze themselves between the upper and lower fingers 191 and 192, as shown in FIG. 11. In this state, the upper finger 191 is shifted from the seventh position to the eighth position as the opening mechanism 20 reaches the fourth position, the disk 15 is held by the holding device 19, and the lid plate 16 is unlocked from the casing 14 by a suitable mechanism (not shown) and held by the holding device 19.

Figure 12:
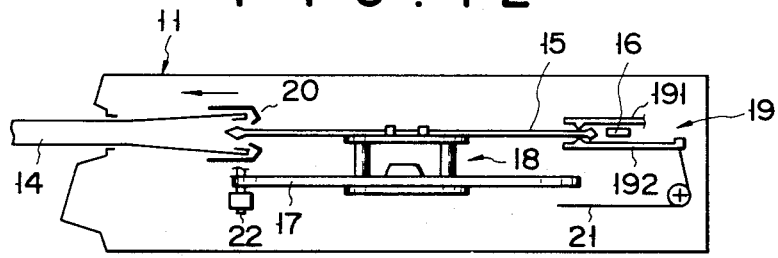
Figure 14:
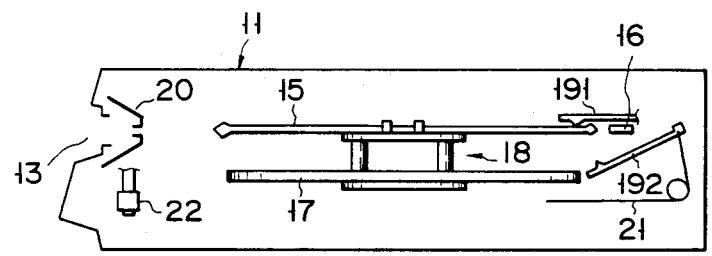

Thereafter, if the casing 14 is pulled outward, only the casing 14 itself will be taken out of the housing 11 since both the disk 15 and the lid plate 16 are held by the holding device 19. After the casing 14 passes over the disk cradle 18 in the second position, the disk cradle 18 rises from the second position to the first position to receive the disk 15 thereon, as shown in FIG. 12. After the casing 14 is entirely removed from the housing 11, the up-and-down mechanism 31 then starts operation. First, the up-and-down mechanism 31 loosens the wire 21 to shift the lower finger 192 from the fifth position to the sixth position, as shown in FIG. 14, thereby causing the holding device 19 to release its hold of the disk 15. Thereafter, the up-and-down mechanism 31 is driven by the drive mechanism 30 to shift the disk cradle 18 from the first position to the second position, and thus the disk 15 is laid on the turntable 17.

When the disk 15 is thus laid on the turntable 17, the player 10 is brought to a reproducible state. This state can be visibly recognized by an operator, fore example, by a lamp. If the operator then pushes the operating button for the designation of reproduction, the turntable 17 starts to rotate, and the pickup arm 23 starts movement to commence prescribed reproducing operation.

After completion of the reproducing operation, the disk 15 is taken out from the player 10 by inversely following the aforesaid processes of inserting operation, as a rule. If the operator pushes the operating button 12 for disk unloading while keeping the turntable 17 stopped and the pickup arm 23 in a reproduction start position, then the drive mechanism 30 operates so as first to raise the disk cradle 18 from the second position to the first position, as shown in FIG. 14, thereby forcing up the disk 15 to the first position, and then to pull the wire 21 so that the lower finger 192 is brought to the fifth position against the urging force of the spring 39, as shown in FIG. 13.

Figure 13:
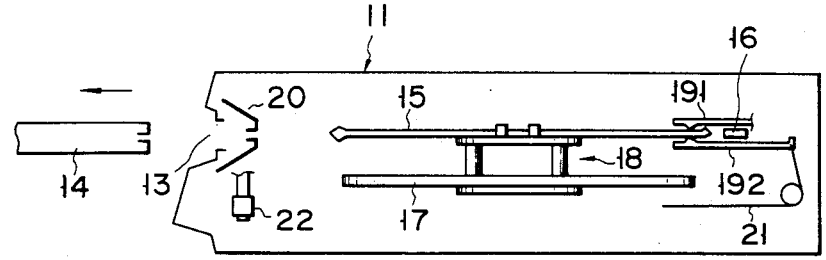

If the empty casing 14 is inserted into the housing 11, in the state shown in FIG. 13, the disk 15 is housed in the casing 14 after going through the states shown in FIGS. 12, 11 and 10 in succession, and the opening 141 of the casing 14 is closed by the lid plate 16. After successively going through the states shown in FIGS. 9, 8 and 7, the casing 14 is removed from the player 10.

Thus, the operator is enabled to set the disk 15 on the turntable 17 without directly touching the disk 15. Hereupon, if the operator leaves by mistake the player 10 in the state shown in FIG. 13, then the disk 15 will possibly be warped by its own weight. Accordingly, those players are conventionally used which are connected with a control circuit so that, when the state shown in FIG. 13 lasts for a predetermined time, e.g., for several minutes, the disk cradle 18 will automatically descend from the first position to the second position to allow the disk 15 to be laid on the turntable 17. In those prior art players, however, if the power supply is cut by mistake while in the state shown in FIG. 13, the control circuit will not be able to operate. In such a case, the use of the control circuit would be good for nothing.

Thus, it is necessary to provide means for automatically setting the disk 15 on the turntable 17 although the power supply is cut in the state shown in FIG. 13. There will now be described an arrangement to meet such need and actualize the operation of the disk cradle 18 is illustrated with reference to FIGS. 7 to 15. This arrangement constitutes one of the features of the present invention.

Figure 16:
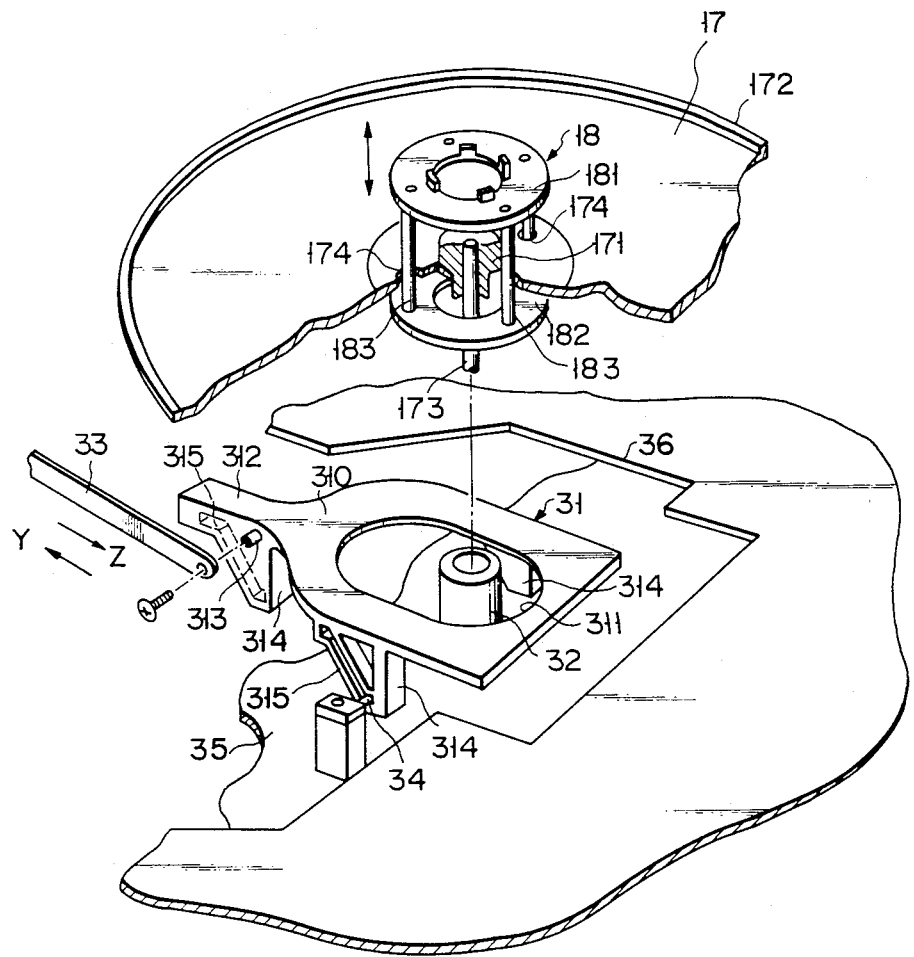
FIG. 16 is a perspective view partially in section showing the disk cradle and an up-and-down mechanism therefor.

As shown in FIG. 16, the turntable 17 has a rotating shaft 173 the upper end of which is fixed to the rotation center portion thereof. The lower end portion of the rotating shaft 173 is rotatably supported by a bearing 32 located below the main chassis 36. The disk cradle 18 attached to the turntable 17 is provided with a pair of rings 181 and 182 between which the central portion of the turntable 17 is sandwiched. A plurality of (four in this embodiment) penetrating holes 74 are concentrically formed at those portions of the turntable 17 which are located around the center spindle 71. A coupling rod 183 is loosely passed through each penetrating hole 174 along the vertical direction. The upper and lower rings 181 and 182 are coupled by means of the coupling rods 183. The upper surface of the upper ring 181 functions as a disk bearing surface to bear the lower surface of the central portion of the disk 15. Thus, the disk cradle 18 is allowed to move vertically relative to the turntable 17. The respective thicknesses of the upper ring 181 and the ridge 172 are so set that the disk bearing surface of the upper ring 81 is located below the disk loading surface of the turntable 17 when the lower surface of the upper ring 81 is in contact with the upper surface of the turntable 17 and the disk cradle 18 is in its lowest position or in the second position. The coupling rod 183 is long enough to raise the disk bearing surface of the cradle 18 up to the first position.

Disposed below the lower ring 182 of the disk cradle 18 is the up-and-down mechanism 31 for raising and lowering the disk cradle 18. The up-and-down mechanism 31 includes a slider 310, which is supported on an under chassis 35 so as to be able to move vertically and to reciprocate in the directions indicated by arrows Y and Z. The slider 310 is provided with an opening 311 through which the rotating shaft 173 of the turntable 17 is passed. The opening 311 is formed of an elongated slot lest the slider 310 reciprocating in the directions indicated by the arrows Y and Z should run against the rotating shaft 173.

A pin 313 protrudes from the lateral face of one end portion 312 of the slider 310. One end of a coupling lever 33 is rotatably mounted on the pin 313. The other end of the coupling lever 33 is connected to the drive mechanism 30. With the aid of the lever 33, the drive mechanism 30 moves the slider 310 to a position (a ninth position) in the direction indicated by the arrow Y and to a position (a tenth position) in the direction indicated by the arrow Z. A plurality of (three in this embodiment) cam plates 314 are attached to the lower surface of the slider 310. Each cam plate 314 has a cam groove 315 which slopes downward in the direction indicated by the arrow Z. A guide pin 34 fixed to the under chassis 35 is fitted in the cam groove 315.

Figure 17:
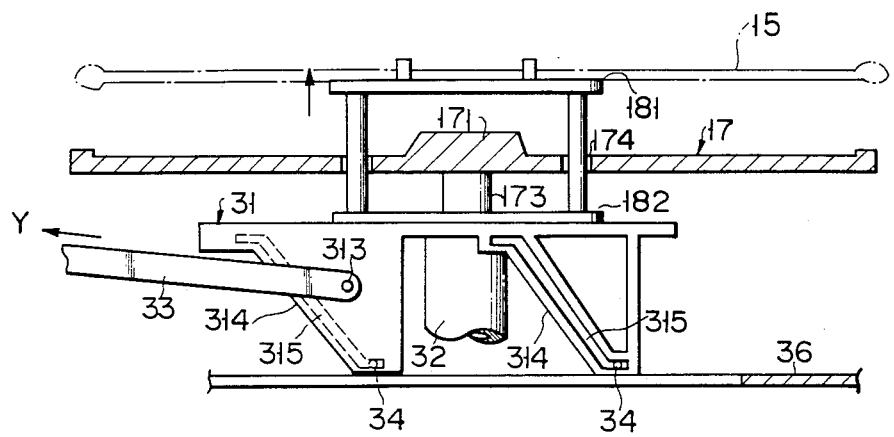
FIG. 17 is a side view showing the disk cradle located in a first position.
Figure 18:
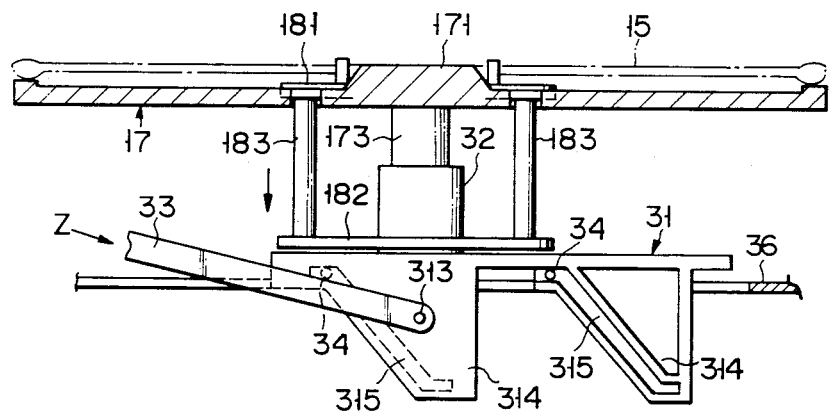
FIG. 18 is a side view showing the disk cradle located in a second position.

Since the up-and-down mechanism 31 is constructed in this manner, the slider 310 rises as shown in FIG. 17 when the drive mechanism 30 moves the lever 33 in the direction indicated by the arrow Y to located the slider 310 in the ninth position. As the slider 310 rises, the upper surface of the slider 310 strikes against the lower surface of the lower ring 182 of the disk cradle 18 to lift up the disk cradle 18 to the first position. As the drive mechanism 30 moves the lever 33 in the direction indicated by the arrow Z to locate the slider 310 in the tenth position, moreover, the slider 310 descends as shown in FIG. 18. Accompanying such descent, the disk cradle 18 is lowered to the second position by its own weight.

Referring now to FIGS. 19 to 26, the drive mechanism 30 will be described in detail.

Figure 19:
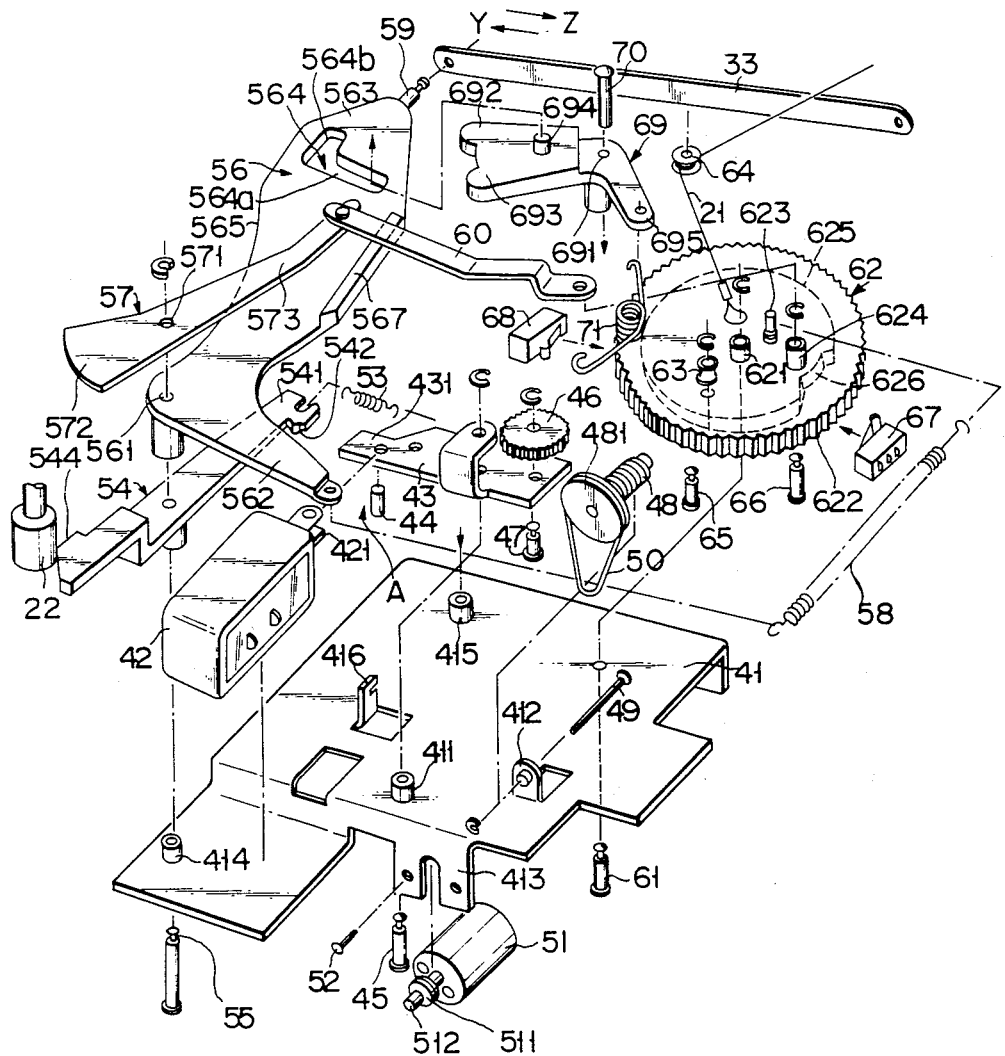
FIG. 19 is a disassembled perspective view extractively showing a drive mechanism.
Figure 20:
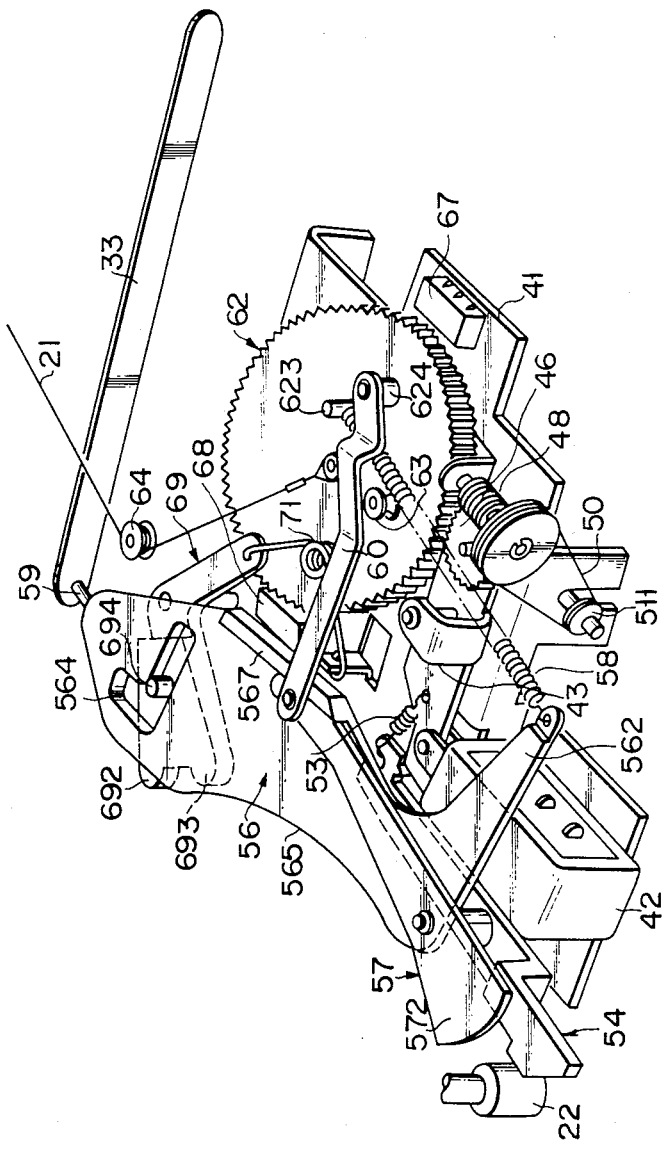
FIG. 20 is a perspective view showing an assembled state of the drive mechanism shown in FIG. 19.

As shown in FIGS. 19 and 20, the drive mechanism 30 is provided with a mounting chassis 41 to be attached to the main chassis 36. A solenoid 42 is fixed on the mounting chassis 41. The solenoid 42 has a plunger 421 capable of moving in the axial direction thereof. When the solenoid 42 is energized, the plunger 421 is drawn in by a magnetic force to an eleventh position. When the solenoid 42 is de-energized or demagnetized, on the other hand, the plunger 421 is projected from the solenoid 42 to a twelfth position by the urging force of a spring 53 mentioned later. The distal end of the plunger 421 is rotatably mounted on one end portion 431 of a solenoid lever 43 by means of a pin 44. The substantially central portion of the solenoid lever 43 is rotatably mounted on the mounting chassis 41 by means of a pin 45. The pin 45 is supported by a bearing 411 attached to the mounting chassis 41. A worm wheel 46 is rotatably mounted on the other end of the solenoid lever 43 by means of a pin 47. The solenoid lever 43 is driven to rock around the pin 45 as the plunger 421 of the solenoid 42 moves. The solenoid 42, plunger 421, solenoid lever 43 and worm wheel 46 constitute a clutch mechanism A.

A worm 48 is provided always in mesh with the worm wheel 46. A pulley 481 is integrally formed at one end of the worm 48 so as to be coaxial therewith. The worm 48 is rotatably mounted on the mounting chassis 41 by means of a pin 49 which is attached to a raised strip 412 on the mounting chassis 41. A reversible motor 51 is fixed by means of screws 52 to a bent portion 413 which is formed in that portion of the lower surface of the mounting chassis 41 which is located substantially under the worm 48. A pulley 511 is coaxialy fixed to a driving shaft 512 of the motor 51. An endless belt 50 is stretched between the pulley 481 of the worm 48 and the pulley 511 of the driving shaft 512. Thus, when the motor 51 drives the driving shaft 512 to rotate, the worm wheel 46 is rotated continually.

A lock lever 54 is rockably mounted on the mounting chassis 41 so as to be located beside the solenoid 42. The lock lever 54 is suported at its substantially middle portion by means of a pin 55, which is rotatably supported by a bearing 414 fixed to the mounting chassis 41. One end portion 541 of the lock lever 54 extends close to the one end portion 431 of the solenoid lever 43 so that an engaging portion 542 formed at the one end portion 541 of the lock lever 54 can engage the one end portion 431 of the solenoid lever 43. In the engaged state, the solenoid lever 43 is locked with the plunger 421 of the solenoid 42 kept in the eleventh position. A spring 53 is stretched between the one end portion 541 of the lock lever 54 and the one end portion 431 of the solenoid lever 43. The spring 53 urges the solenoid lever 43 to rock from the eleventh position to the twelfth position. A cam portion 544 is formed at the other end portion of the lock lever 54. The cam portion 544 is touched by the roller 22 of the opening mechanism 20 in the third position. In the touched state, the lock lever 54 is rocked in the counterclockwise direction of FIG. 19 against the urging force of the spring 53, so that the engaging portion 542 of the lock lever 54 is disengaged from the one end portion 431 of the solenoid lever 43. In this state, if the solenoid 42 is not excited, the plunger 421 is held in the twelfth position by the urging force of the spring 53.

A cam lever 56 and a stop lever 57 are also rockably mounted on the pin 55 on which the lock lever 54 is mounted pivotally. The cam lever 56 has a substantially L-shaped plane configuration, and is rockably supported by the pin 55 fitted in a penetrating hole 561 bored through its bent portion. One end portion 562 of the cam lever 56 on the side of the solenoid 42 is connected with one end of a tension spring 58 mentioned later. The tension spring 58 urges the cam lever 56 to rock counterclockwise. A pin 59 protrudes from the tip of the other end portion 563 of the cam lever 56. The other end of the coupling lever 33 is rockably mounted on the pin 59. Thus, the coupling lever 33 is moved in the directions indicated by the arrows Y and Z as the cam lever 56 rocks counterclockwise and clockwise, respectively, around the pin 55.

A substantially L-shaped slot 564 is formed in the other end portion 563 of the cam lever 56. The slot 564 is composed of a first slot portion 564a defined by circular arcs described around the penetrating hole 561, and a second slot portion 564b extending along the inserting direction X from that end portion of the first slot portion 564a which is positioned on the left-hand side of FIG. 19. The slot 564 is wide enough to allow a stopper pin 694 mentioned later to be loosely fitted therein. The cam lever 56 is so regulated as to be able to rock between a position (a thirteenth position) where the stopper pin 694 is located at the left-hand end portion of the first slot portion 564a and a position (a fourteenth position) where the stopper pin 694 abuts on the right-hand end edge of the first slot portion 564a. When the cam lever 56 is in the thirteenth position, the slider 310, which is coupled with the cam lever 56 by means of the coupling lever 33, is located in the tenth position, so that the disk cradle 18 is held in the second position. When the cam lever 56 is in the fourteenth position, on the other hand, the slider 310 and the disk cradle 18 are held in the ninth and first positions, respectively.

A cam portion 565 is formed on the left-hand side of the other end portion of the cam lever 56. The cam portion 565 is so designed as not to engage the roller 22 of the opening mechanism 20 when the cam lever 56 is in the thirteenth position, and to stand in the path of the roller 22 moving from the third position to the fourth position to engage the roller 22 when the cam lever 56 is in the fourteenth position. As the roller 22 engages the cam portion 565, the cam lever 56 is returned from the fourteenth position to the thirteenth position against the urging force of the spring 58. A bank portion 567 extends on and along the right-hand side edge of the other end portion of the cam lever 56.

A penetrating hole 571 is formed substantially in the central portion of the stop lever 57. The stop lever 57 is rotatably mounted on the pin 55 fitted in the hole 571. A regulating portion 572 is formed at one end portion of the stop lever 57 on the side of the roller 22. The other end portion 573 of the stop lever 57 extends close to the bank portion 567 of the cam lever 56 so as to be able to engage the bank portion 567. One end portion of a coupling member 60 is rockably mounted on the other end portion 573 of the stop lever 57. The other end portion of the coupling member 60 is rockably mounted on an eccentric mounting pin 66 of a cam gear 62 mentioned later. The rocking position of the stop lever 57 around the pin 55 is regulated by the rocking position of the cam gear 62.

A cylindrical member 621 is attached to the central portion of the upper surface of the cam gear 62, and a penetrating hole is bored through the cylindrical member 621 and the cam gear 62. The cam gear 62 is rotatably mounted on the mounting chassis 41 by means of a pin 61 attached thereto and passed through the penetrating hole. The cylindrical member 621 is connected with the other end of the wire 21. The wire 21 is supported in the middle by a pulley 64. A gear portion 622 is formed on the outer peripheral surface of the cam gear 62. The cam gear 62 is mounted in such a position that the worm wheel 46 meshes with the gear portion 622 when the plunger 421 of the solenoid 42 is in the eleventh position, and that the worm wheel 46 does not mesh with the gear portion 622 when the plunger 421 is in the twelfth position.

Another cylindrical member 624 for mounting the mounting pin 66 is formed at that portion of the upper surface of the cam gear 62 which is deviated at a given distance from the central portion of the cam gear 62. Also, a projection 623 is fixed to that portion of the upper surface of the cam gear 62 which is at a given counterclockwise angular distance from the another cylindrical member 624. The projection 623 is connected with the other end of the tension spring 58. The tension spring 58 urges the cam gear 62 to rock clockwise.

The cam gear 62 is stopped from rotating clockwise by a stop mechanism (not shown) to act against the urging force of the tension spring 58, and is held in a stop position. In the stop position, the stop lever 57, whose rocking position depends on that of the cam gear 62, is held in a fifteenth position. When the stop lever 57 is in the fifteenth position, the bank portion 567 of the cam lever 56 abuts on the other end portion 573 of the stop lever 57, and the cam lever 56 is held in the thirteenth position. When the stop lever 57 is in the fifteenth position, moreover, the regulating portion 572 at the one end portion of the stop lever 57 stands in the movement path of the roller 22 of the opening mechanism 20. As the roller 22 engages the regulating portion 572, the opening mechanism 20 is prevented from moving from the third position to the fourth position.

When the cam gear 62 rotates counterclockwise from the stop position, the bank portion 567 of the cam lever 56 is caused to strike against the other end portion 573 of the stop lever 57 by the urging force of the spring 58, thereby rocking the cam lever 56 counterclockwise from the thirteenth position to the fourteenth position. When the cam lever 56 reaches the fourteenth position, the stop lever 57 and the cam gear 62 reach a sixteenth position and an intermediate position, respectively. In this state, the cam lever 56 is prevented from rocking counterclockwise as the stopper pin 694 abuts on the right-hand end edge of the first slot portion 564a. Accordingly, when the cam gear 62 rocks further counterclockwise from the intermediate position, the stop lever 57 rocks further counterclockwise, though the cam lever 56 is held in the fourteenth position. When the cam gear 62 reaches a limit position for its counterclockwise rocking, the stop lever 57 is held in a seventeenth position. When the stop lever 57 is in the seventeenth position, there is a predetermined space between the other end portion 573 of the stop lever 57 and the bank portion 567 of the cam lever 56.

Accompanying the counterclockwise rocking of the cam gear 62, the projection 623 engages and pulls the wire 21 stretched between the cylindrical member 621 and the lower finger 192 of the holding device 19. The pulley 64 is so located that the projection 623 engages the wire 21 when the cam gear 62 reaches the intermediate position. Thus, the wire 21 is pulled as the cam gear 62 is rocked counterclockwise from the intermediate position to the limit position.

A spring bearing roller 63 is rockably mounted by means of a pin 65 on that portion of the upper surface of the cam gear 62 which is at a given clockwise angular distance from the another cylindrical member 624. The roller 63 is intended to engage and pull the tension spring 58 when the cam gear 62 rocks counterclockwise from the stop position.

A cam disk 625 is coaxially fixed to the lower surface of the cam gear 62. A depression 626 is formed at part of the outer periphery of the cam disk 625. A first microswitch 67 is attached to that portion of the mounting chassis 41 which faces the depression 626 when the cam gear 62 is in the stop position. The first microswitch 67 is provided for electrically detecting the cam gear 62 being in the stop position by means of its actuator falling into the depression 626. Further, a second microswitch 68 is attached to that portion of the mounting chassis 41 which faces the depression 626 when the cam gear 62 is in the limit position. The second microswitch 68 is provided for electrically detecting the cam gear 62 being in the limit position by means of its actuator falling into the depression 626.

A toggle lever 69 is rotatably mounted on that portion of the mounting chassis 41 which is located under the other end portion of the cam lever 56. The toggle lever 69 has a substantially L-shaped plane configuration, and has a penetrating hole 691 at its bent portion. A pin 70 is passed through the hole 691, and the lower end of the pin 70 is supported by a bearing 415 attached to the mounting chassis 41 so that the toggle lever 69 is rotatably supported on the mounting chassis 41. A pair of lugs 692 and 693 are formed at one end portion of the toggle lever 69. The lugs 692 and 693 are arranged at a given space on a circular arc around the pin 70. When the one lug 692 is located in the path of the roller 22 of the opening mechanism 20 to be allowed to engage the roller 22, the other lug 693 is not allowed to engage the roller 22, and vice versa. The toggle lever 69 is located in an eighteenth position when the one lug 692 is allowed to engage the roller 22, and is located in a nineteenth position when the other lug 693 is allowed to engage the roller 22. The stopper pin 694 is fixed to the upper surface of the toggle lever 69.

The other end portion 695 of the toggle lever 69 is connected with one end of a toggle spring 71. The other end of the toggle spring 71 is connected to a bent strip 416 formed on the mounting chassis 41. The toggle spring 71 urges the toggle lever 69 toward the eighteenth or nineteenth position. When the toggle lever 69 is in the eighteenth position, the stopper pin 694 is in the first slot portion 564a and allows the cam lever 56 to rock between the thirteenth and fourteenth positions. When the cam lever 56 is in the thirteenth position, the stopper pin 694 can move into the second slot portion 564b, and the toggle lever 69 is allowed to rock between the eighteenth and nineteenth positions. When the toggle lever 69 is in the nineteenth position, the cam lever 56 is held in the thirteenth position.

Referring now to FIGS. 21 to 26, there will be described the driving operation of the drive mechanism 30 of the above-mentioned construction in conjunction with FIGS. 7 to 15.

Figure 21:
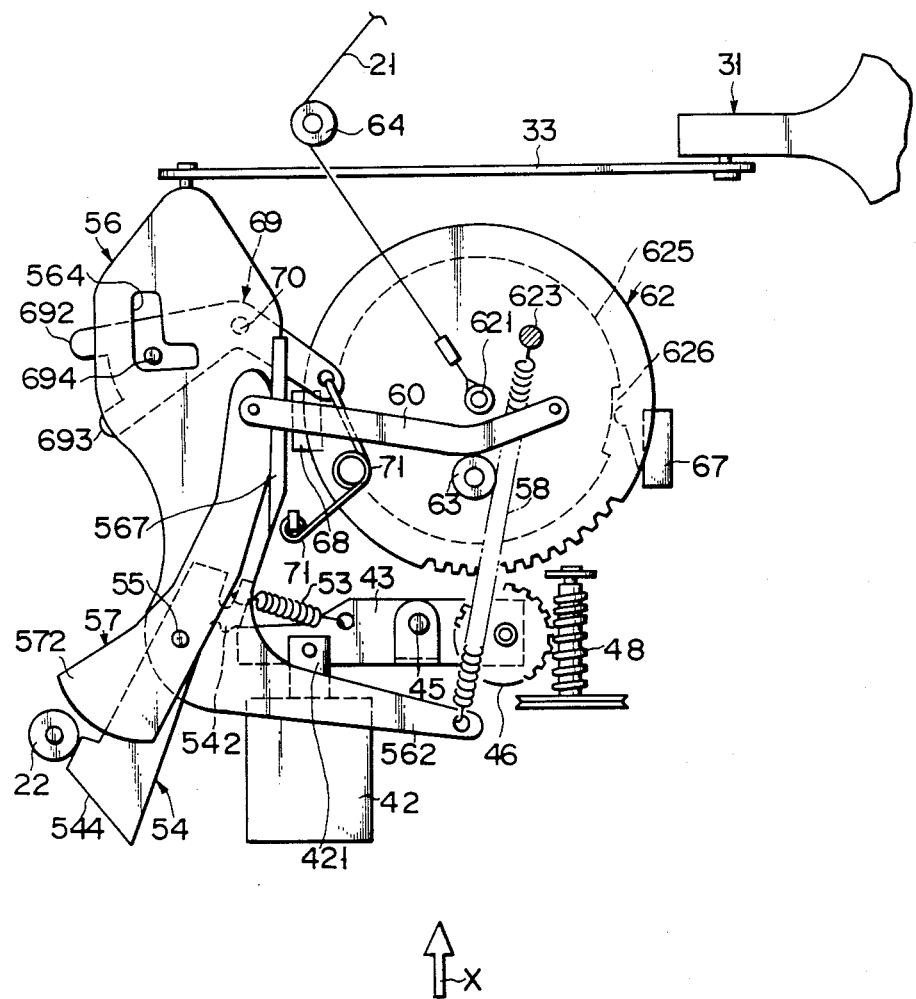

FIG. 21 shows a state before the power is turned on. Since the solenoid 42 is not energized, the plunger 421 is urged to be held in the twelfth position by the spring 53. Accordingly, the worm wheel 46 and the cam gear 62 are not in mesh, and the cam gear 62 is urged to be held in the stop position by the spring 58. The stop lever 57 is held in the fifteenth position by the cam gear 62, while the cam lever 56 is held in the thirteenth position by the stop lever 57. In this state, the roller 22 is prohibited from moving from the third position to the fourth position, regulated by the regulating portion 572 of the stop lever 57. Namely, when the power is turned off, the casing 14 is prevented from being inserted into the housing 11 through the inlet slot 13. Since the cam lever 56 is in the thirteenth position, the slider 310 is in the tenth position, and the bearing surface of the disk cradle 18 is held in the second position below the loading surface of the turntable 17, as shown in FIG. 18. Since the wire 21 is not pulled by the projection 623 of the cam gear 62, moreover, the lower finger 192 of the holding device 19 is urged toward the sixth position by the spring 39, as shown in FIG. 5.

Figure 22:
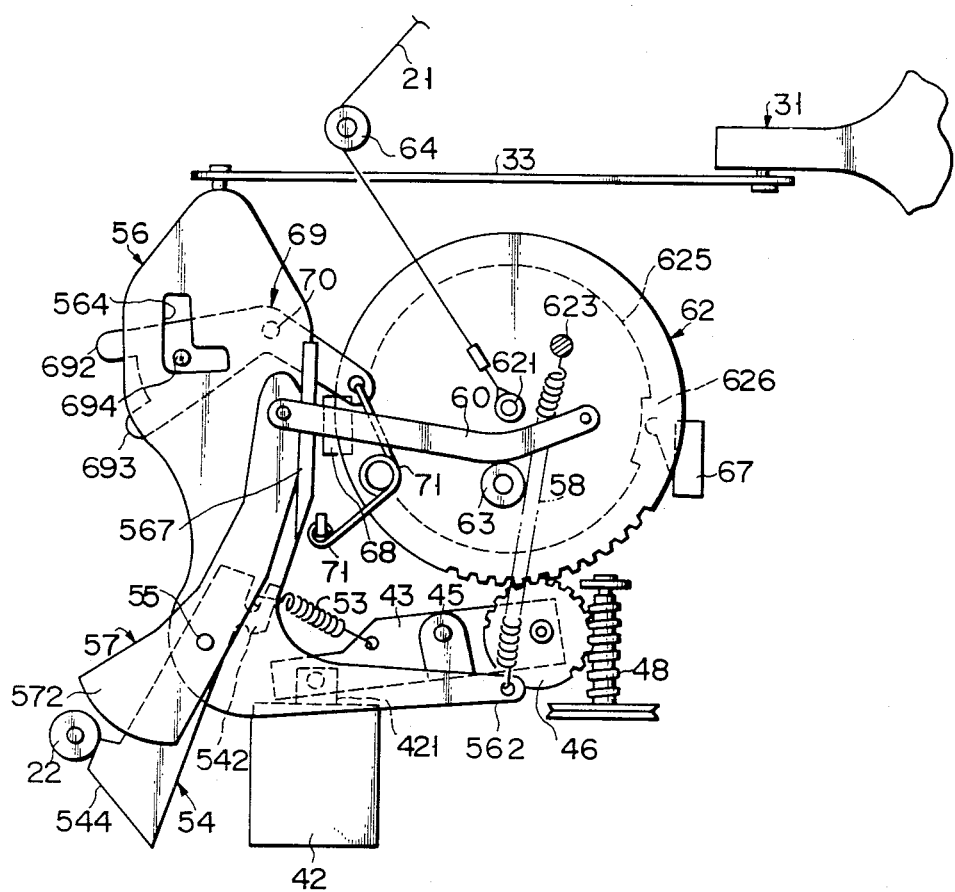

When the power is turned on in the state shown in FIG. 21, the solenoid 42 is energized, and the plunger 421 is urged to move from the twelfth position to the eleventh position. Accordingly, the solenoid lever 43 is rocked counterclockwise around the pin 45 against the urging force of the spring 53, and the worm wheel 46 meshes with the cam gear 62, as shown in FIG. 22. In this state, the rotatory force of the motor 51 is allowed to be transmitted to the cam gear 62.

Figure 23:
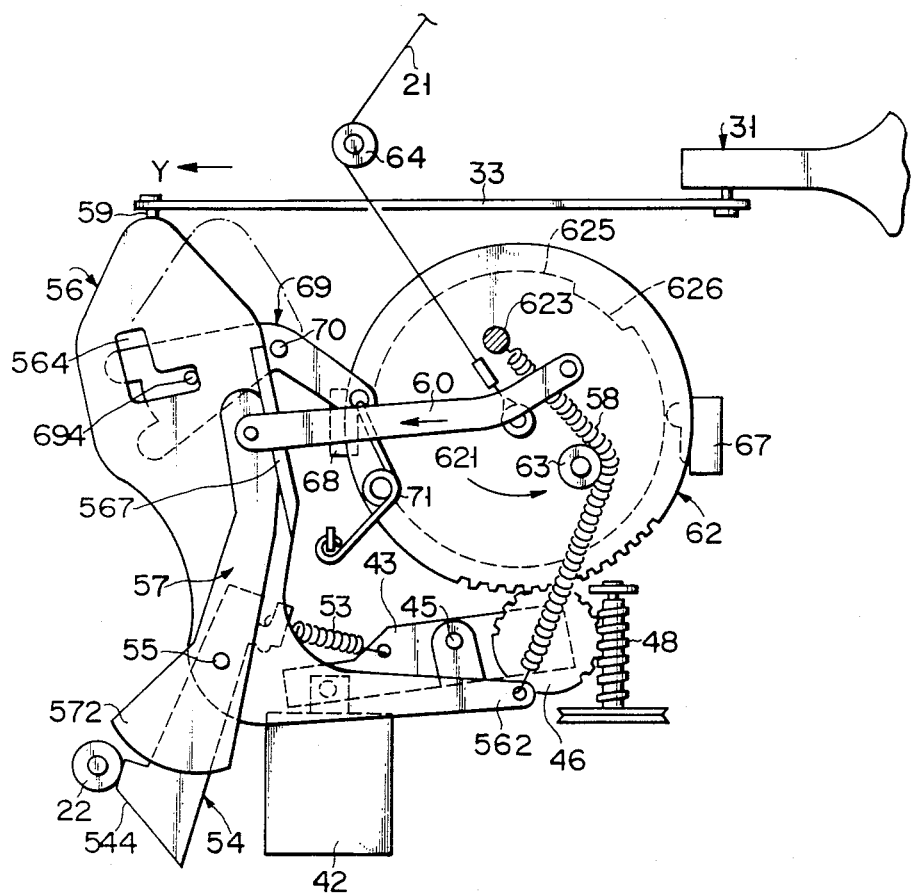
FIG. 23 is a plan view showing the drive mechanism in such a state that a cam gear is rocked to an intermediate position.

After the solenoid 42 is energized, on the other hand, the motor 51 is started to drive the driving shaft 512 in one direction, so that the cam gear 62 is rocked counterclockwise to the intermediate position against the urging force of the spring 58, as shown in FIG. 23. As the cam gear 62 rocks in this manner, the stop lever 57 is rocked from the fifteenth position to the sixteenth position, so that the cam lever 56 is rocked from the thirteenth position to the fourteenth position. As the cam lever 56 rocks in this way, the coupling lever 33 is moved in the direction indicated by the arrow Y, and the slider 310 is moved from the tenth position to the ninth position. Accompanying such movement of the slider 310, the disk cradle 18 moves from the second position to the first position. As the cam gear 62 rocks from the intermediate position to the limit position, the stop lever 57 rocks from the sixteenth position to the seventeenth position, though the cam lever 56 is held in the fourteenth position through engagement with the stopper pin 694. When the stop lever 57 is brought to the seventeenth position, the regulating portion 572 is removed from the movement path of the roller 22, so that the roller 22 is allowed to move, that is, the opening mechanism 20 is allowed to move from the third position to the fourth position. In other words, the casing 14 is allowed to be inserted into the housing 11 through the inlet slot 13.

Figure 24:
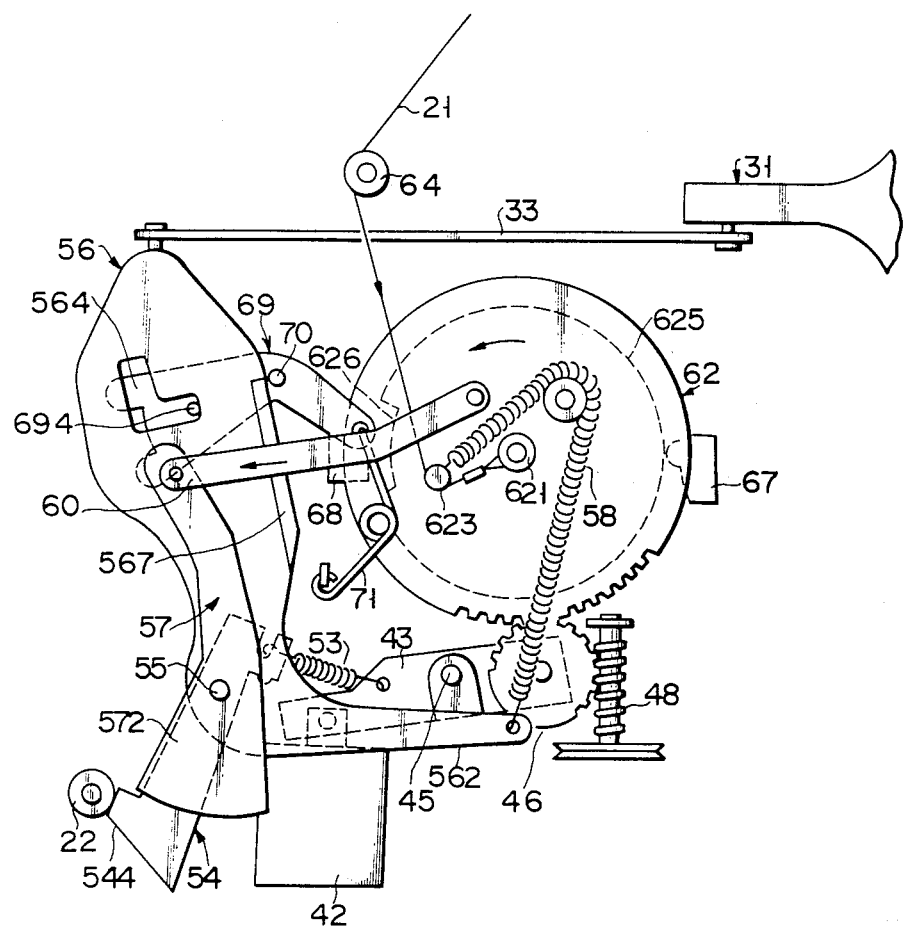
FIG. 24 is a plan view showing the drive mechanism in such a state that the cam gear is rocked to a limit position.

As the cam gear 62 rocks from the intermediate position to the limit position, the projection 623 of the cam gear 62 engages and pulls the wire 21, as shown in FIG. 24. As a result, the lower finger 192 of the holding device 19 is rocked from the sixth position to the fifth position against the urging force of the spring 39, and gets ready to receive the disk 15 being inserted between itself and the upper finger 191. The attainment of the cam gear 62 to the limit position is detected by the second microswitch 68, when the drive of the motor 51 is stopped. The state shown in FIG. 24 corresponds to the state shown in FIG. 7, which is a stand-by state for the insertion of the casing 14. After the drive of the motor 51 is stopped, the cam gear 62 is held in the limit position through the engagement between the worm 48 and the worm wheel 46 although it is urged to rock clockwise by the spring 58.

Figure 25:
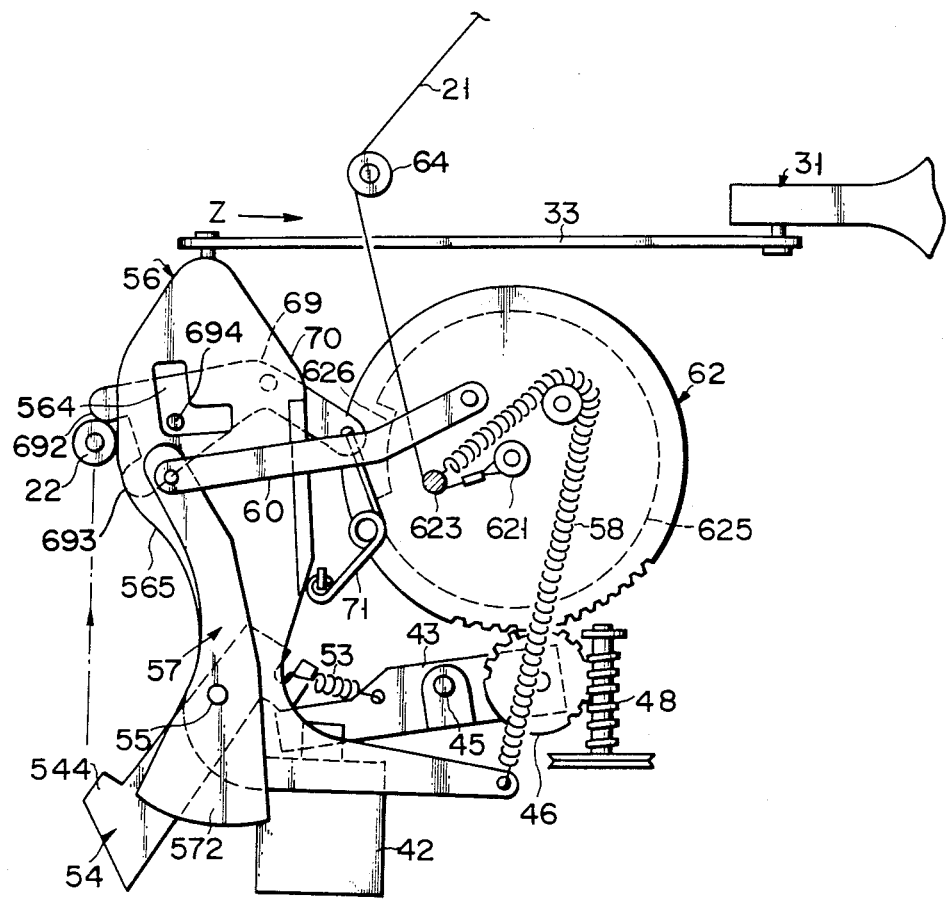
FIG. 25 is a plan view showing the drive mechanism in such a state that a roller engages a cam lever.
Figure 26:
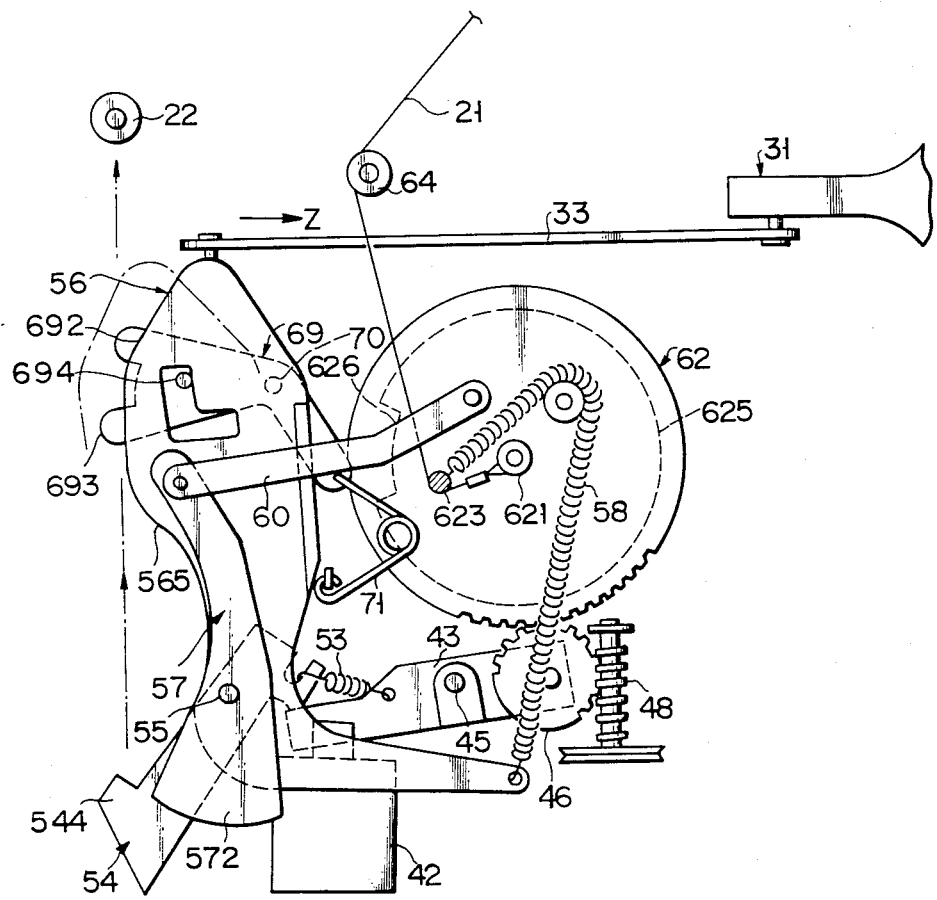
FIG. 26 is a plan view showing the drive mechanism in such a state that the cam lever is stopped by a toggle lever.

If the casing 14 is inserted into the housing 11 in the state shown in FIG. 24, the opening mechanism 20 moves from the third position to the fourth position while widening the opening 141 of the casing 14, as described before. Thereupon, when the roller 22 of the opening mechanism 20 moves in the direction indicated by the arrow X accompanying the insertion of the casing 14, as shown in FIG. 25, the roller 22 first engages the cam portion 565 of the cam lever 56, so that only the cam lever 56 is forced to return from the fourteenth position to the thirteenth position against the urging force of the spring 58. Based on the aforementioned connections, the disk cradle 18 is lowered from the first position to the second position. The state of FIG. 25 corresponds to the state shown in FIG. 10. When the roller 22 is moved from the third position, as shown in FIG. 25, the cam portion 544 of the lock lever 54 is released from the regulation by the roller 22. Accordingly, the lock lever 54 is rocked clockwise by the urging force of the spring 53, and the engaging portion 542 of the lock lever 54 engages the one end portion of the solenoid lever 43 to hold the solenoid lever 43 in the eleventh position. Thereafter, the roller 22 is further inserted in the direction indicated by the arrow X to engage the one lug 692 of the toggle lever 69 to shift the toggle lever 69 from the eighteenth position to the nineteenth position. As a result, the stopper pin 694 of the toggle lever 69 moves into the second slot portion 564b of the cam lever 56, and the cam lever 56 is held in the thirteenth position, as shown in FIG. 26.

Then, after going through the state shown in FIG. 11, the disk 15 is held by the holding device 19 in the aforementioned manner, and the casing 14 is drawn out from the housing 11. By the removal of the casing 14, the roller 22 of the opening mechanism 20 is moved in the opposite direction to the direction indicated by the arrow X to engage the other lug 693 of the toggle lever 69, thereby moving the toggle lever 69 from the nineteenth position to the eighteenth position. By the removal of the casing 14, moreover, the roller 22 is disengaged from the cam portion 565 of the cam lever 56. Thus, the cam lever 56 is set free, and is rocked from the thirteenth position to the fourteenth position by the spring 58. Namely, the disk cradle 18 rises from the second position to the first position, and the central portion of the disk 15 contained in the housing 11 is received by the disk cradle 18, as shown in FIG. 12.

When the casing 14 is entirely removed from the housing 11, as shown in FIG. 13, the roller 22 returns to the third position to provide a reproduction stand-by state, as shown in FIG. 24. In this state, the lock lever 54 is pressed against the roller 22, and the engaging portion 542 of the lock lever 54 is separated from the one end portion of the solenoid lever 43 against the urging force of the spring 53. If an operator gives an instruction for the reproducing operation in this state, the motor 51 is first driven so as to rotate the driving shaft 512 in the other direction. Since the solenoid 42 is kept energized, the engagement between the worm wheel 46 and the cam gear 62 is maintained, and the cam gear 62 is rocked clockwise from the limit position toward the intermediate position. As the cam gear 62 rocks to the intermediate position, the projection 623 pulling the wire 21 gradually relaxes its pull, and finally ceases to pull the wire 21 when the cam gear 62 reaches the intermediate position shown in FIG. 23. Namely, the lower finger 192 of the holding device 19 rocks from the fifth position to the sixth position to release its hold of the lower surface of the outer peripheral portion of the disk 15. Even if the cam gear 62 then rocks from the limit position to the intermediate position, the disk cradle 18 will be held in the first position because the stop lever 57 is rocked from the seventeenth position only up to the sixteenth position. Thus, even though the lower surface of the outer peripheral portion of the disk 15 is released from the support by the holding device 19, the central portion of the disk 15 is still supported by the disk cradle 18.

Figure 15:
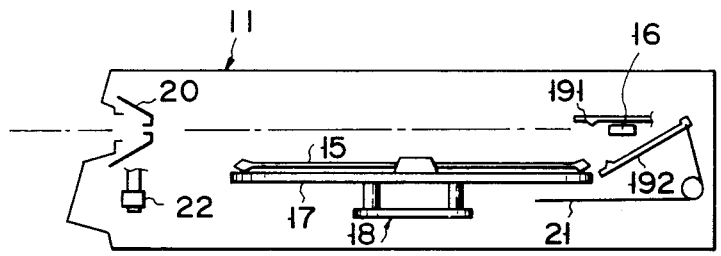

Subsequently, as the cam gear 62 rocks from the intermediate position to the stop position, the stop lever 57 is rocked from the sixteenth position to the fifteenth position, and the cam lever 56 is rocked from the fourteenth position to the thirteenth position through the engagement between the other end portion of the stop lever 57 and the bank portion 567 of the cam lever 56 to reach the position shown in FIG. 22. Namely, the disk cradle 18 is lowered from the first position to the second position, and the disk 15 is laid on the turntable 17, as shown in FIG. 15. The return of the cam gear 62 to the stop position is detected by the first microswitch 67, then the drive of the motor 51 is stopped.

Thereafter, the turntable 17 is rotated, and the pickup arm 23 moved to start the prescribed reproducing operation. When the prescribed reproducing operation is completed and the pickup arm 23 is returned to the start position, the motor 51 is rotated again in the one direction in order to take out the disk 15 from the housing 11. According to the aforementioned processes of operation, the disk cradle 18 first rises from the second position to the first position, and then the lower finger 192 of the holding device 19 rises from the sixth position to the fifth position to support the lower surface of the outer peripheral edge of the disk 15 in the first position thereof. In this state, the empty casing 14 is inserted into the housing, and the disk 15, along with the lid plate 16, is housed in the casing 14 in the aforementioned manner. Then, the disk 15 is removed from the housing 11 as the casing 14 is drawn out from the housing 11.

Thereupon, the player 10 is cut off from the power supply, and a series of processes of reproducing operation is completed.

If the state shown in FIG. 13 is left to last for several minutes during the removal of the disk 15, then the motor 51 is driven by a control circuit (not shown) to rotate in the other direction to restore the state shown in FIG. 15. Accordingly, the disk 15 will never be left in the state of FIG. 1 for a long time to be warped.

According to this embodiment, even if the power supply is cut by mistake in the state shown in FIG. 13 during the removal of the disk 15, the state shown in FIG. 15 can be restored automatically without the operation of the control circuit. If the power is turned off by mistake in the state shown in FIG. 13 or 24, the solenoid 42 is de-energized or demagnetized. Accordingly, the plunger 421 is moved from the eleventh position to the twelfth position by the urging force of the spring 53. Accompanying such movement, the solenoid lever 43 rocks clockwise around the pin 45, and the worm wheel 46 is separated and hence disengaged from the cam gear 62. Freed in the limit position, therefore, the cam gear 62 is rocked clockwise by the urging force of the spring 58, and is returned to the stop position.

In short, if the power supply is cut by mistake in the state shown in FIG. 24, the player 10 is automatically restored to the state shown in FIG. 21 by the urging force of the spring 58 without the aid of the control circuit. Thus, the disk 15 is thoroughly prevented from warping due to accidental cut of power supply.

According to this embodiment, as described in detail herein, when the solenoid 42 is energized, the cam gear 62 is caused to mesh with the worm wheel 46 so that the driving force of the motor 51 can be transmitted thereby. When the solenoid 42 is not energized, on the other hand, the cam gear 62 and the worm wheel 46 are out of mesh and cannot transmit the power of the motor 51, and the cam gear 62 is allowed to rotate freely. With use of such an arrangement, the cam gear 62 may be returned by the urging force of the spring 58 to the stop position where the disk 15 is allowed to be laid on the turntable 17, in case of accidental cut of power supply. Thus, the disk 15 is prevented from being warped due to a prolonged stay on the disk cradle 18.

Although the cam gear 62 is always urged by the spring 58 to return to the stop position, it will never be caused actually to do so by the urging force of the spring 58 while the solenoid is energized, because of the use of the worm 48 and the worm wheel 46 in the power transmission mechanism which mesh with each other.

Thus, without the use of any special lock mechanism for the cam gear 62, the position of the cam gear 62 with the solenoid 42 energized can securely be maintained with ease.

When the roller 22 of the opening mechanism 20 is in the third position near the inlet slot 13, that is, when the casing 14 is not inserted in the housing 11 yet, the lock lever 54 regulated by the roller 22 is separated from the solenoid lever 43, which is urged by the spring 53 to rock in the direction to separate the worm wheel 46 from the cam gear 62. Therefore, the worm wheel 46 is caused to mesh with the cam gear 62 against the urging force of the spring 53 when the solenoid 42 is energized, and is separated from the cam gear 62 by the spring 53 when the solenoid 42 is de-energized. When the roller 22 leaves the third position, that is, when at least the forward end of the casing 14 is put in the housing 11, the lock lever 54 ceases to be regulated by the roller 22 and is caused to engage the solenoid lever 43 by the urging force of the spring 53, thereby locking the solenoid lever 43. Accordingly, even if the power supply is cut by mistake while at least part of the casing 14 remains in the housing 11, the plunger 421 is held in the eleventh position, and the engagement between the worm wheel 46 and the cam gear 62 is maintained. Namely, even if the power supply is cut by mistake while the casing 14 is being inserted for the removal of the disk 15, the disk cradle 18 will be held in the first position to allow the disk 15 to be housed securely in the casing 14. Thus, the disk cradle 18 is allowed automatically to return to the second position in case of accidental cut of power supply only when the casing 14 is kept outside the housing 11. This positively maintains the reliability of operation.

The common tension spring 58 can provide both the force of the cam gear 62 to return to the stop position and the force of the cam lever 56 to rock counterclockwise from the thirteenth position to the fourteenth position. Thus, the player 10 is simplified in construction.

Further, the position of the cam lever 56, which is shifted from the fourteenth position to the thirteenth position by the movement of the roller 22 of the opening mechanism 20 from the third position to the fourth position accompanying the insertion of the casing 14, is held by the toggle lever 69 which is shifted from the eighteenth position to the nineteenth position by the aforesaid movement of the roller 22. As the roller 22 moves from the fourth position to the third position accompanying the removal of the casing 14, moreover, the toggle lever 69 is shifted from the nineteenth position to the eighteenth position, so that the cam lever 56 is released from the hold by the toggle lever 69, and returns from the thirteenth position to the fourteenth position. Thus, the disk cradle 18 can smoothly descend and ascend as the casing 14 is inserted into or removed from the housing 11.

If the stop lever 57 is in the fifteenth position where the disk cradle 18 is restricted to the lower second position, that is, if the power is turned off or the disk 15 is already on the turntable 17, the regulating portion 572 of the stop lever 57 stands in the movement path of the roller 22 to prevent the roller 22 from moving from the third position to the fourth position. Thus, the casing 14 may securely be prevented from being inserted in the player 10 while the player 10 is not in the stand-by state for reproduction or is in the middle of reproducing operation. This leads to an improvement in safety.

Thus, the player 10 according to the abovementioned embodiment has various advantages.

What is claimed is:

1. An apparatus for reproducing signals recorded on a disk which is kept in a casing at all times except when being reproduced in the apparatus, said apparatus comprising:
    a housing having a port through which the casing with the disk is inserted into the housing;
    a turntable rotatably disposed in the housing and having a disk loading surface supporting the outer peripheral edge of the disk to carry the disk thereon;
    a disk cradle disposed at the central portion of the turntable to be able to move up and down and having a disk bearing surface supporting the central portion of the disk to carry the disk thereon, said disk cradle being able to move between a first position where the disk bearing surface is located above the disk loading surface and substantially flush with said port, and a second position where the disk bearing surface is located below the disk loading surface so that the disk supported on the disk bearing surface is laid on the turntable;
    holding means located substantially flush with said port and capable of moving between a third position where the holding means holds the outer peripheral portion of the disk and a fourth position where the disk is released from the hold;
    a drive source for supplying a driving force;
    drive means connected with the holding means and the disk cradle to drive them both by means of the driving force from the drive source, said drive means raising the disk cradle to the first position and then shifting the holding means to the third position when the power is turned on, lowering the disk cradle to the second position while keeping the holding means in the third position as the casing is inserted, raising the disk cradle to the first position as the casing is drawn out, shifting the holding means to the fourth position and then lowering the disk cradle to the second position in response to an instruction for the start of reproducing operation, and raising the disk cradle to the first position and then shifting the holding means to the third position in response to an instruction for the end of the reproducing operation; and
    a clutch mechanism disposed between the drive means and the drive source, said clutch mechanism connecting the drive source with the drive means, thereby being capable of transmitting the driving force when the power is turned on, and said clutch mechanism disconnecting the drive source with the drive means, thereby causing the drive means to shift the holding means in the third position to the fourth position and then to lower the disk cradle in the first position to the second position when the power is turned off, and wherein said drive means includes:
    (i) a first member capable of moving between a fifth position to locate the disk cradle and the holding means in the first and third positions, respectively, and a sixth position to locate the disk cradle and the holding means in the first and fourth positions, respectively, and between the sixth position and a seventh position to locate the disk cradle and the holding means in the second and fourth positions, respectively; and
    (ii) first urging means for urging the first member to move from the fifth position to the seventh position via the sixth position, whereby the first member in the fifth position is moved to the seventh position by the first urging means when the power is turned off.

2. The apparatus according to claim 1, wherein said clutch mechanism includes:
    a second member capable of moving between an eighth position where the driving force from said drive source is transmitted to the drive means and a ninth position where the driving force is not transmitted; and
    second urging means urging the second member to move to the eighth position when the power is turned on and to the ninth position when the power is turned off.

3. The apparatus according to claim 2, wherein
    said first member includes a gear capable of rocking between the fifth and sixth positions and between the sixth and seventh positions,
    said drive source includes a motor and a worm driven thereby to rotate, and said second member includes a worm wheel always in mesh with the worm and capable of moving between the eighth and ninth positions, said worm wheel meshing with the gear in the eighth position and separating from the gear in the ninth position.

4. The apparatus according to claim 3, wherein said second urging means includes a solenoid connected to the worm wheel to move between the eighth and ninth positions, the worm wheel is urged to move to the eighth position when the power is turned on to excite the solenoid.

5. The apparatus according to claim 4, wherein said second urging means further includes a first spring for urging the worm wheel to move from the eighth position to the ninth position, said worm wheel is moved to the eighth position against the urging force of the first spring when the solenoid is excited, and is moved to the ninth position by the urging force of the first spring when the solenoid is demagnetized.

6. The apparatus according to claim 5, wherein said first member further includes:
a first lever capable of movement and located in tenth, eleventh and twelfth positions corresponding to the fifth, sixth and seventh positions of the gear;
a second lever coupled with the disk cradle and capable of moving between a thirteenth position to locate the disk cradle in the first position and a fourteenth position to locate the disk cradle in the second position; and
third urging means for urging the second lever to move from the fourteenth position to the thirteenth position.

7. The apparatus according to claim 6, wherein said second lever has an engaging portion capable of engaging the first lever, and the second lever is located between the fourteenth and thirteenth positions through the engagement between the engaging portion and the first lever caused by the third urging means when the first lever is between the twelfth and eleventh positions.

8. The apparatus according to claim 7, wherein said drive means includes stopper means for stopping the second lever at the thirteenth position when the first lever is shifted from the eleventh position to the tenth position.

9. The apparatus according to claim 8, wherein said first and third urging means are formed of a common spring.

10. The apparatus according to claim 9, which further comprises a roller in the housing capable of moving between a fifteenth position near the port and a sixteenth position near the holding means, said roller being shifted from the fifteenth position to the sixteenth position as the casing is inserted into the housing through the port and to be shifted from the sixteenth position to the fifteenth position as the casing is drawn out from the housing, and said roller being capable of engaging the second lever in the thirteenth position as said roller moves, thereby biasing the second lever from the thirteenth position to the fourteenth position against the urging force of the third urging means.

* * * * *